(No Model.) 2 Sheets—Sheet 1.
W. DEUTSCH.
WARDROBE TRUNK.
No. 515,118. Patented Feb. 20, 1894.
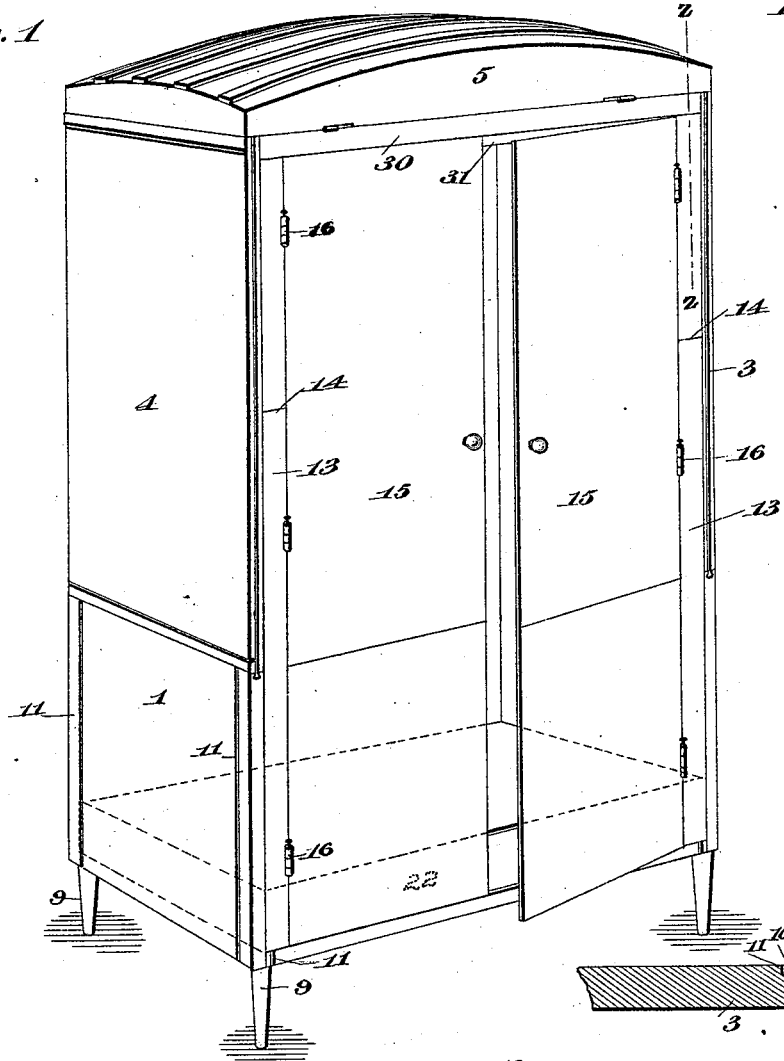
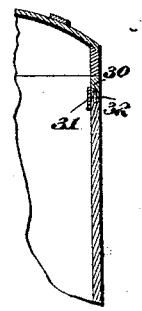
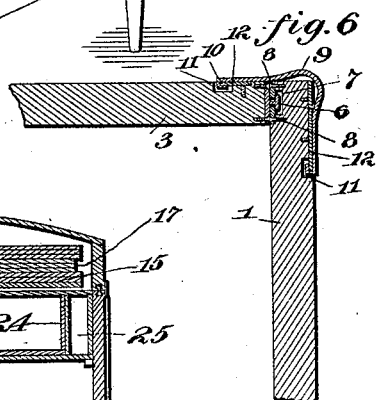
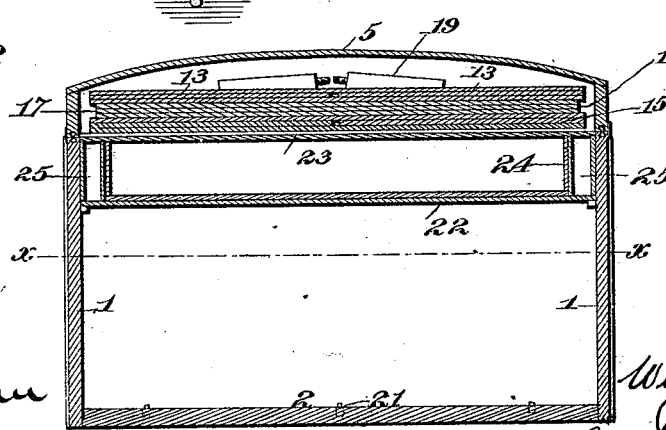
Witnesses
J. F. Pikeman
Will E. Neff
Inventor
William Deutsch
By J. A. Watson
Attorney (No Model.)
2 Sheets—Sheet 2.
W. DEUTSCH.
WARDROBE TRUNK.
No. 515,118.
Patented Feb. 20, 1894.
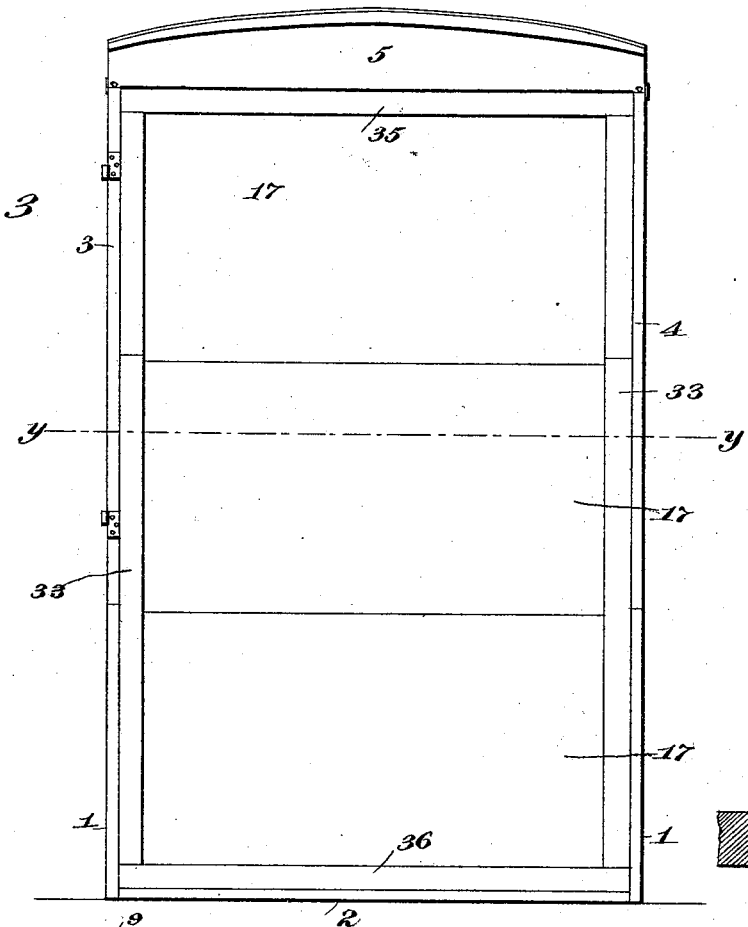
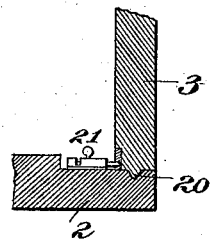
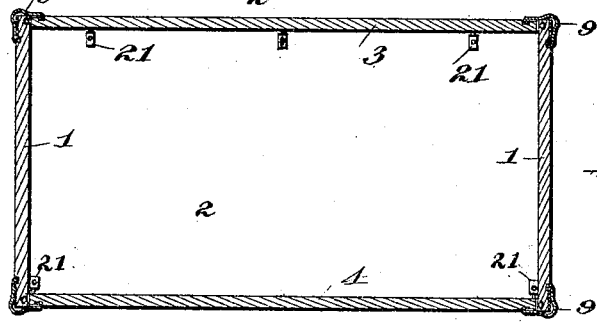
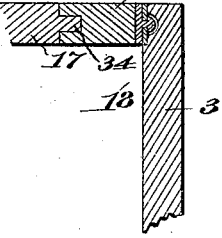
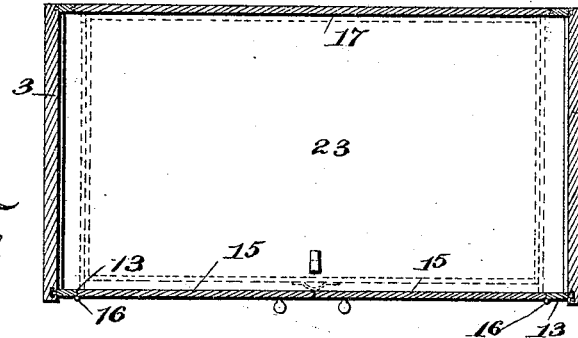
Witnesses
J. F. Heman
Will E. Neff
Inventor
William Deutsch
By J. F. Watson
Attorney

UNITED STATES PATENT OFFICE.

WILLIAM DEUTSCH, OF BALTIMORE, MARYLAND, ASSIGNOR TO CLARA DEUTSCH, OF SAME PLACE, AND EVA DEUTSCH, OF NEW YORK, N. Y.

WARDROBE-TRUNK.

SPECIFICATION forming part of Letters Patent No. 515,118, dated February 20, 1894.

Application filed June 5, 1893. Serial No. 476,654. (No model.)

*To all whom it may concern:*

Be it known that I, WILLIAM DEUTSCH, a citizen of the United States, residing at Baltimore, in the State of Maryland, have invented certain new and useful Improvements in Wardrobe-Trunks, of which the following is a specification.

My invention relates to an improvement in convertible or wardrobe trunks and it consists more particularly in a trunk which may be used for ordinary traveling purposes and which, when occasion requires, may be taken apart and set up to form a commodious wardrobe which is entirely inclosed and provided with doors and a drawer.

In the accompanying drawings in which like reference signs refer to similar parts throughout the several views, Figure 1 is a perspective view of the wardrobe. Fig. 2 is a longitudinal central section of the trunk. Fig. 3 is a rear view of the wardrobe. Fig. 4 is a horizontal section of the trunk on the line *x—x* of Fig. 2. Fig. 5 is a horizontal section of the wardrobe on the line *y—y* of Fig. 3. Fig. 6 is an enlarged view of one of the corners shown in Fig. 4. Fig. 7 is an enlarged view of one of the rear corners shown in Fig. 5. Fig. 8 is a section showing one of the fastenings for connecting the front and back of the trunk with the bottom, and Fig. 9 is a section on the line *z—z* of Fig. 1.

The trunk proper is formed of the usual parts, viz.; two ends, 1, 1, which may be rigidly attached or detachably connected to the bottom 2, a back portion 3, a front portion 4 and a lid or cover 5. As shown in Figs. 4 and 6 the back and front portions 3, 4, are removably connected to the ends. They may be connected in various ways but I prefer that illustrated in the drawings which shows a form of tongue and groove joint. On the ends of the back and front portions are fastened tongue strips 6 which have projecting ribs having heads and flanges somewhat of the shape of ordinary railway rails. Near the front and rear edges of the end portions, are formed grooves 7 to receive the tongues of the strips 6, the said grooves being partially closed by bands 8 which are separated sufficiently to allow the flanges of the strips 6 to pass between them. It will be evident that when the back and front portions of the trunk are slid into position between the ends, the tongue strips 6 will interlock with the groove 7 and plates 8 and form a strong connection. I prefer to further reinforce the corners of the trunk by plates 9 which are attached in some strong and convenient manner. As shown the corner plates 9 have hooked edges 10 which extend into grooves 11 and are interlocked with plates 12. These corner plates are slid into position before the trunk is closed and cannot be removed until the trunk is again opened, as they are locked down by the lid.

Referring to Figs. 1 and 5 it will be seen that the sides of the wardrobe are composed of the ends of the trunk together with the back and front portions of the trunk erected on top of the trunk ends. For this purpose the top of each end is grooved to admit the tongues of the strips 6 of the back and front. The lid of the trunk is detachable and is intended to serve as a top for the wardrobe. I find it preferable to reverse the lid when placing it on the wardrobe for the reason that the lock or hasp would be unsightly in front of the wardrobe. The lower edges of the ends of the lid are grooved so that the lid may be slid on and interlocked with the sides of the wardrobe, and in this manner the top, bottom and ends of the wardrobe are all interlocked. Before placing the lid or top on the wardrobe the doors are hung and the back put in place. The doors hang on strips or door jambs 13 which have tongues that fit into grooves in the inner edges of the sides of the wardrobe as shown in the sectional view in Fig. 5. These strips 13 are jointed at 14 so that they may be folded up and stored in the trunk, preferably in the lid, as shown in Fig. 2. The strips 13 are preferably divided in the proportion of one-third and two-thirds, as are also the doors 15, the joint in the strips 13 being opposite the longer portion of the door and the joint in the doors being opposite the longer portions of the strips. The doors 15 are composed of light boards or other light material and they are preferably connected to the strips or door-jambs 13 by means of loose-pin hinges 16, so that they can be readily detached. By using three hinges to each door the doors will be kept in perfect alignment notwithstanding the fact that they are each made in two sections which are hinged together. In order to more thoroughly brace the door frame and form a stop for the doors to swing against, I insert a strip 30 above the door jambs and between the sides 3, 4, of the wardrobe. The strip 30 is provided on its inner lower edge with a depending plate 31, against which the doors rest when closed. The strip 31 is preferably made of sheet metal similar to the strip which usually surrounds the lower edge of a trunk lid. Dowel pins 32 may be provided in the ends of the door jambs and corresponding holes in the strip 30, as shown in Fig. 9. This will serve to hold the door jambs more rigidly in place.

The back of the wardrobe is composed of three principal sections 17, each section being similar in shape to the back and front of the trunk but somewhat smaller in dimensions. These sections may be made of light boards or other suitable material, similar to the doors. Side strips 33 similar to the door jambs are connected by sliding joints to the sides of the wardrobe and the back sections 17 are provided with tongues 34 which fit into grooves in strips 33 as shown in Fig. 7. Top and bottom strips 35, 36, may also be provided for the back and connected to the side strips 33 by dowel pins in a similar manner to that shown in Fig. 9. The parts enumerated above complete the outer portion of the wardrobe. Legs 19 may be attached if desired to raise the wardrobe to a more convenient height. In transforming the wardrobe into a trunk the lid and the strips 30 and 35 are first removed and then the door hinges disconnected and the doors folded up. The door-jambs may then be removed and similarly folded up. The back is then removed and afterward the side portions 3, 4, are detached from the ends and slid into their proper positions at the back and front of the trunk. In order to form a tight and dust proof joint at the bottom of the trunk the lower edges of the back and front portions are provided with shallow tongues 20 which fit into corresponding grooves in the bottom as shown in Fig. 8. In the same figure is shown a spring bolt or catch 21, several of which are provided to lock the back and front portions to the bottom. The lid is then hinged to the back of the trunk and the doors, door-jambs, back-sections and legs are stored away in the lid as shown in Fig. 2.

A novel feature of my invention consists in a tray so constructed that it may be utilized as a drawer in the bottom of the wardrobe. As shown in Figs. 2 and 5 the tray consists of an outer casing 22 provided with a hinged cover 23, in appearance similar to the usual trunk tray. Within the tray is a drawer 24. When the tray is in the trunk it is accessible in the usual manner by lifting the lid. When the wardrobe is set up the tray is placed in the bottom of the wardrobe as shown in dotted lines in Fig. 1. In this position when the wardrobe is full of clothes it would be inconvenient to lift the lid and for this reason the drawer is supplied. When the wardrobe doors are open the drawer may be drawn out and used as an ordinary bureau drawer. The drawer is made shorter that the tray so that it may be drawn out between the door jambs 13 and the spaces 25 at each end of the drawer may be formed into compartments for small articles.

The ends of the trunk body should be nearly square, that is, the horizontal dimensions of the end should be equal to the height of the front and back pieces so that they will register when the front and back are used as the sides of the wardrobe. The length of the trunk is preferably made about twice the width although the length may be varied if desired. By arranging the joints in the door jambs opposite the middle of the longer portions of the doors and sides, the structure will be well braced and practically as rigid as if there were no joints in the various parts.

It will be understood that suitable folding or detachable hooks will be provided in the lid of the trunk when it is used upon the top of the wardrobe from which to suspend clothing or other articles.

By covering or coloring the doors and the various extra parts necessary to make up the wardrobe so as to correspond with the trunk proper, I am enabled to give the wardrobe a uniform and finished appearance, thus making it an ornamental as well as a useful piece of furniture.

It will be obvious that my improved wardrobe may be fitted up with a series of shelves instead of hooks, or it may have shelves upon one side and hooks upon the other. Either of these arrangements would be more suitable for a traveling salesman than the plain wardrobe above described. These and other mere mechanical adaptations would, of course, come within the scope of the present invention.

Having described my invention, what I claim, and desire to secure by Letters Patent, is—

1. In a wardrobe trunk, the trunk proper having its front and back portions removable and adapted to be connected with the upper edges of the ends of the trunk to form in conjunction therewith the sides of the wardrobe, substantially as described.

2. In a wardrobe trunk, the trunk proper having its front and back portions removable, and its ends fixed to the bottom said front and back portions being connected with the ends by tongue and groove joints, substantially as described, and fastenings for connecting the back and front portions to the bottom, as set forth.

3. In a wardrobe trunk, the trunk proper having its ends fixed to the bottom and its back and front portions removable, means for connecting the said back and front portions to the ends and bottom of the trunk, and removable corner strips for protecting and strengthening the corners of the trunk, substantially as described.

4. In a wardrobe trunk the combination with the trunk proper, of a removable tray consisting of an outer casing having a lid, and an inner drawer, substantially as described.

5. In a wardrobe trunk, the trunk proper having its ends fixed to the bottom and its front and back portions removable and adapted to be connected with the upper edges of the ends to form the sides of the wardrobe, in combination with the back sections, the doors and door jambs, all adapted to be stored in the trunk, substantially as described.

6. In a wardrobe trunk, the trunk proper having its front and back portions removable and adapted to be connected with the ends to form the sides of a wardrobe, in combination with a back formed in sections, a pair of strips or door jambs, each formed of a long and a short section and a pair of doors, each formed of a long and a short section, whereby said doors and door jambs may be folded up for storage in the trunk, substantially as described.

7. In a wardrobe trunk, the trunk proper having its front and back portions removable and adapted to be connected with the ends to form the sides of the wardrobe, the lid removable and adapted to form the top of the wardrobe, the removable back composed of strips connected to the sides of the wardrobe by sliding interlocking joints and horizontal sections connected to the strips, the sectional door jambs also connected to the sides of the wardrobe by sliding interlocking joints, the horizontal stop strip above the door jambs and the sectional doors each connected to the door jambs by three hinges, substantially as described.

8. A tray for a wardrobe trunk consisting of an outer casing having a hinged lid, and an inner drawer, whereby is formed a suitable tray for the trunk and a covered drawer for the wardrobe, substantially as described.

In testimony whereof I affix my signature in presence of two witnesses.

WILLIAM DEUTSCH.

Witnesses:
JNO. WATSON, Jr.,
THOS. M. DOBBIN.